US011613189B2

(12) United States Patent
Murgod et al.

(10) Patent No.: US 11,613,189 B2
(45) Date of Patent: Mar. 28, 2023

(54) B-SIDE DISTRIBUTION SYSTEM (71) Applicant: GENTHERM INCORPORATED, Northville, MI (US)

(72) Inventors: Ajay Murgod, Novi, MI (US); Ricardo Edmundo Flores Gonzalez, Novi, MI (US)

(73) Assignee: GENTHERM INCORPORATED, Northville, MI (US)

( * ) Notice: Subject to any disclaimer, the term of this patent is extended or adjusted under 35 U.S.C. 154(b) by 0 days.

(21) Appl. No.: 17/610,256

(22) PCT Filed: Jun. 12, 2020

(86) PCT No.: PCT/US2020/037435
§ 371 (c)(1),
(2) Date: Nov. 10, 2021

(87) PCT Pub. No.: WO2020/263601
PCT Pub. Date: Dec. 30, 2020

(65) Prior Publication Data
US 2022/0242285 A1 Aug. 4, 2022

Related U.S. Application Data (60) Provisional application No. 62/868,311, filed on Jun. 28, 2019.

(51) Int. Cl.
*B60N 2/56* (2006.01)
*B60N 2/06* (2006.01)
(52) U.S. Cl.
CPC ......... *B60N 2/5657* (2013.01); *B60N 2/5628* (2013.01); *B60N 2/5642* (2013.01)

(58) Field of Classification Search
CPC ... B60N 2/5657; B60N 2/5628; B60N 2/5642
See application file for complete search history.

(56) References Cited

U.S. PATENT DOCUMENTS 6,869,139 B2 * 3/2005 Brennan .............. B60N 2/5657
297/180.12
7,083,227 B2 * 8/2006 Brennan .................. A47C 7/74
297/452.42
(Continued)

FOREIGN PATENT DOCUMENTS

CN 204236294 U 4/2015
DE 202009017046 U1 5/2010
(Continued)

OTHER PUBLICATIONS

International Search Report and Written Opinion dated Oct. 8, 2020, for International Application No. PCT/US2020/037435.

Primary Examiner — Shin H Kim
(74) Attorney, Agent, or Firm — The Dobrusin Law Firm, P.C.

(57) ABSTRACT

A distribution system for a vehicle seat The distribution system includes one or more plenums that each have a cap layer, a support layer, and an open space formed between the cap layer and the support layer. The support layer is a generally rigid material and the cap layer is a generally flexible material that is connected to the support layer. The open space includes one or more baffles that assist in directing fluid between a blower connected to the one or more plenums and one or more ventilation holes.

20 Claims, 7 Drawing Sheets (56) References Cited

U.S. PATENT DOCUMENTS

| | | | |
|---|---|---|---|
| 7,506,938 B2* | 3/2009 | Brennan | B60N 2/5635 297/180.13 |
| 11,318,869 B2* | 5/2022 | Greenwood | B60N 2/5657 |
| 2007/0158981 A1* | 7/2007 | Almasi | B60N 2/5614 297/180.12 |
| 2021/0300218 A1* | 9/2021 | Greenwood | B60N 2/5657 |
| 2021/0339661 A1* | 11/2021 | Pacilli | B60N 2/5642 |
| 2022/0242285 A1* | 8/2022 | Murgod | B60N 2/5657 |

FOREIGN PATENT DOCUMENTS

| | | |
|---|---|---|
| WO | 91/02665 A1 | 3/1991 |
| WO | 2017/011990 A1 | 1/2017 |
| WO | 2019/112823 A1 | 6/2019 |

* cited by examiner

B-SIDE DISTRIBUTION SYSTEM

PRIORITY

This application is a U.S. national stage entry of PCT/US2020/037435 filed on Jun. 12, 2020, which claims the benefit of U.S. 62/868,311 filed Jun. 28, 2019, the entireties of which are hereby incorporated by reference herein for all purposes.

FIELD

The present teachings relate generally a distribution system that connects to a back side (i.e., b-side) of a cushion of a vehicle seat and more particularly a plenum having one or more flexible coverings and spacers, where the plenum connects a blower to a cushion, while the plenum assists in distributing fluid within the cushion.

BACKGROUND

For many years, industry has been concerned with designing improved conditioning systems for articles of manufacture such as seats, steering wheels, automotive vehicles, or other transportation vehicles. Examples of such conditioning systems are disclosed in U.S. Pat. Nos. 3,394,887; 5,613,729; 5,924,766; 7,322,643; and 9,055,820 and U.S. Patent Application Publication Nos. 2018/0147961; 2018/0147962; and 2018/0178692 all of which are expressly incorporated herein by reference for all purposes.

Many systems include a conditioner that is located on a top of a seat with a blower that is located on a bottom of the seat such that air is moved from a remote location to the insert to distribute the air. Some systems include an extended tail that extends from a location on top of the seat to a location behind or under the seat where a blower is located. These systems include a blower that is connected to the seat frame and the tail connects the inset to the blower. Some systems have attempted to connect a blower and insert to a back side of a seat and distribute fluid from the back side of the seat.

What is needed is an air distribution system that connects to a back side of a cushion and distributes air along a rear surface of the cushion. What is needed is a blower that is connected to a plenum and the plenum includes a cap layer that is made of fleece to assist in guiding air to predetermined locations.

SUMMARY

The present teachings include: a distribution system comprising: (a) one or more plenums each including: (i) an cap layer, (ii) a support layer, and (iii) an open space formed between the cap layer and the support layer; wherein the support layer is a rigid material and the cap layer is a flexible material that is connected to the support layer, and air is moved through the support layer to provide conditioning to an occupant.

The present teachings provide an air distribution system that connects to a back side of a cushion and distributes air along a rear surface of the cushion. The present teachings provide a blower that is connected to a plenum and the plenum includes a cap layer that is made of fleece to assist in guiding air to predetermined locations.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved conditioning system suitable for integration into a vehicle. For example, the conditioning system may be integrated into or attached to carriers (e.g., members, structures, panels, floors, walls, or the like) of various articles of manufacture such as buildings, furniture, transportation vehicles, (e.g., boats, trains, airplanes, motorcycles, all terrain vehicles, busses, snowmobiles, or otherwise) or the like. Alternatively, the conditioning system may be integrated into or attached to various components of transportation vehicles such as seats, benches, panels, footwells, floor mats, or other components. Preferably, the conditioning system is integrated into a vehicle seat. More preferably, the conditioning system is integrated on a rear side (e.g., B-side of a vehicle seat).

The conditioning system is particularly suitable for integration into a seat of an automotive vehicle. More particularly, the conditioning system is suitable for integration with the seat portion with or without bolsters, back portion with or without bolsters, head rest portion, or a combination thereof. The conditioning system may be located between two layers of the seat. The conditioning system may be located under a fabric layer (e.g. cloth, leather, synthetic leather, or the like) and under a cushion or backrest (e.g. a foam support for the user). In one aspect, the present teachings employ a structure that makes the distribution system particularly suited for use beneath a perforated leather seat cover or perforated synthetic leather seat cover. Preferably, the distribution system and conditioning system is located below the cushion and directs air through the cushion and seat cover. The present conditioning system is particularly attractive for use in combination with a conditioned seat (e.g. a ventilated, actively cooled (such as by use of a thermoelectric device or module), or actively heated seat). The conditioning system may be integrated with the seat foam support by way of moulding, gluing, or other attachment methods. Preferably, the conditioning system includes a distribution system and the distribution system is connected to a seat suspension without use of any adhesives, gluing, or both. More preferably, the conditioning system is included underneath the cushion of the seat and the cushion assists in distributing air from the conditioning system to an occupant, predetermined locations, or both. The seat suspension and the cushion may be directly connected via clips and the plenum may be sandwiched therebetween. The plenum may have no direct attachment to the seat suspension or cushion other than being in contact. The conditioning system may include one or more blowers and one or more inserts (i.e., plenums); one or more heaters, one or more thermoelectric devices, or a combination thereof.

A conditioned seat may include one or more air movers (air movers and blowers are used interchangeably herein). The one or more air movers may move air through one or more inserts that are located within or are located behind the backrest cushion, seat cushion, or both. The one or more plenums may distribute the air from the air mover. The one or more air movers may be an axial fan, a radial fan, or both. Preferably, the one or more air movers are a radial fan. The one or more air movers may include a Thermoelectric Device (TED). The TED may heat air as the air enters the air mover or as the air leaves the air mover. The TED may cool air as the air enters the air mover or as the air leaves the air mover. The one or more air movers may include a heating device, a cooling device, or both (i.e. a thermoelectnc device (TED)). The TED may be used to heat air and/or cool air that is blown into a cushion or towards the user. The air mover and TED may be placed in the seat in many different configurations or in communication with a vehicle seat insert. For example, the TED and/or air mover may be used in any manner or any configuration with an insert described in any of U.S. Pat. Nos. RE38,128; 4,923,248; 6,629,724; 6,676,207; 6,857,697; 6,869,139; 6,869,140; 6,976,734; 7,083,227; 7,213,876; 7,338,117; 7,356,912; 7,475,938; 7,506,938; and 7,587,901 or U.S. Patent Application Publication No. 2009-0218855 the teachings of which are expressly incorporated by reference herein for all purposes. The TED and heater may both produce heat at the same time; however, it is contemplated that the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user. The air may be blown through the insert, a heater, perforations in the seat cover (e.g. trim layer), holes or perforations in a cushion, or a combination thereof. Some examples of air permeable seats and heating device are U.S. Pat. Nos. 6,064,037 and 6,869,140 both of which are incorporated by reference herein for all purposes. The TED may blow hot air while the heater contemporaneously heats the seat; thereby, providing both conduction heating and convection heating. The plenum may include cutouts, internal slits, external slits, voids, apertures, carrier configuration, or the like may be shaped similarly or be aligned with the perforations in the seat cover, the cushion, or both.

One or more cushions of the seat may include ventilation, active cooling, active heating, or a combination thereof. The seat may include one or more air movers (i.e. blower) in fluid connection to the one or cushions so that air may be blown onto the user or so that air may be pulled away from the user. The cushion may include through holes. The through holes may extend from a rear surface (e.g., B-side) to a front side (e.g., A-side) of the cushion. The cushion may be made of foam. The cushion may prevent an occupant from feeling a distribution system that is located on the b-side of the cushion (e.g., prevents read through). The cushion may be connected to or part of a conditioning system, support, a seat suspension, or a combination thereof.

The conditioning system may be used in conjunction with an occupant sensor. An occupant sensor may be used on any seat in conjunction with a conditioning system. Preferably, an occupant senor may only be used on passenger seats. The occupant senor may be any type of occupant senor that senses a passenger in a vehicle seat. The occupant senor may be a membrane sensor, a capacitive sensor, a force sensor, a mass sensor, or a combination thereof. A microprocessor may monitor the occupant senor for a passenger. For example, the microprocessor may be attached to an occupant senor and when the occupant senor measures that the seat is free of an occupant the conditioning system may remain off even if all of the other conditions are met such as the conditioning system being turned on. The occupant sensor may be in contact with a plenum. Preferably, the occupant sensor is located on a top of a cushion and the plenum is located under the cushion. The conditioning system may include one or more distributions systems.

The one or more distribution systems function to guide a fluid towards or away from an occupant contact region. The one or more distribution systems are preferably are located in, on, or under a bun, a backrest, or both of a vehicle seat. The distribution system may include one or more blowers, one or more plenums, one or more, or both. The distribution system may assist in guiding a fluid to the cushion, through the cushion, towards an occupant, or a combination thereof. The distribution system may prevent fluid (e.g., about 10 percent or less, about 5 percent or less, or about 3 percent or less of a total volume of fluid may escape from the distribution system) from escaping to locations outside of a predetermined location.

The plenum functions to connect to a cushion and assist in transporting fluid through the cushion. Preferably, the plenum functions to connect itself and a blower to a rear side of a cushion. The plenum may be connected to the cushion via two-way tape. Preferably, the plenum is in contact with but not directly connected to the cushion. For example, the seat frame or seat suspension may support the plenum and at least a portion of the cushion so that the plenum and cushion are maintained in contact. The plenum may be an insert, a bag, or both. The plenum may include open edges. The plenum may be sandwiched between a frame and a cushion when an occupant is in contact with the cushion and pressure of an occupant against the cushion may assist in creating a seal between the plenum and the cushion. The plenum may be a two or more pieces connected together. The plenum may be a single piece. The plenum may be created by forming two or more separate pieces or a single piece, cutting openings, and inserting baffles within the plenum. The plenum may be created by forming two or more separate pieces, forming baffles separately, and connecting the baffles to the pieces and connecting the separate pieces together. All or a portion of the plenum may be formed by blow molding, injection molding, thermoforming, extrusion blow molding, vacuum molding, compression molding or a combination thereof. A portion of a plenum may be a cap layer and a lower layer. The one or more pieces of the plenum may be connected by welding (e.g., ultrasonic welding, heat sealing, extrusion welding, hot plate welding, etc.), adhesive (e.g., epoxy, glue, etc.), flanges, or a combination thereof. For example, the cap layer and the plenum may be connected together forming an open space there between. The plenum may be any shape that promotes the flow of air. The plenum may include one or more peripheries. A periphery is an external boundary around an outer edge. The peripheral edge may be a continuous peripheral edge (e.g., a circle or oval with no beginning or end). The peripheral edge may be made up of two or more edges connected together (e.g., a crescent). The peripheral edge may be made up of three or more edges connected together (e.g., a triangle). The peripheral edge may be made up four or more peripheral edges connected together (e.g., a square, rectangle, or diamond). The peripheral edge may be made of five or more sides (e.g., a pentagon). The peripheral edges may have rotational symmetry. The peripheral edges may not have rotational symmetry. The plenum may have a back side, a front side, and a first side and second side. The width of the back side and front side may be the same or either side may be wider than the other. The back side of the plenum may be closest to the bite line of the seat. The bite line of the seat is where the backrest cushion and leg-rest cushion meet. The back side may be substantially straight, curved, angled, concave, convex, serpentine, rounded, or a combination thereof. The front side of the plenum may be a side of the plenum closest to a user's knees or head when located within a seat. The front side may be substantially straight, curved, angled, concave, convex, serpentine, rounded, shaped to a user or occupant's legs, or any combination thereof. The first side and second side may be substantially straight, curved, angled, concave, convex, serpentine, rounded, or any combination thereof. The first side and second side may be parallel. Preferably, the first side and second side are mirror images of each other. For example, the first side and second side may be concave to promote laminar flow between the blower and the ventilation holes. The plenum may include one or more top layers and one or more support layers with one or more insert layers extending between the one or more top layers and the one or more support layers. The plenum may include one or more holes in the one or more top layers, one or more support layers, or both. The plenum may receive air from an air mover and distribute the air to predetermined locations. The plenum may house or create an open space. The plenum may resist crushing when an occupant sits in a vehicle seat. For example, the plenum may not completely seal off and air may flow through an entire volume of the plenum. The plenum may have an open space that is self-supporting. The plenum may have an open space that is free of additional material to maintain the openness of the open space. The plenum may include one or more baffles that assist in directing the flow of air to the ventilation holes. The plenum may be made of or include a polymer, plastic, metal, a thermoset, an elastomer, high density polyethylene (HDPE); acrylonitrile butadiene styrene (ABS), fleece, polyester, synthetic fibers, polyethylene terephthalate, cotton, or a combination thereof. A cap layer and a support layer may be made of different materials. The plenum, layers of the plenum, baffles of the plenum may be formed from a material that is about 5 mm or less, about 4 mm or less, about 3 mm or less, or about 2 mm or less in thickness. The plenum, layers of the plenum, baffles of the plenum may be formed from a material that is about 0.5 mm or more, about 0.73 mm or more, or preferably about 1 mm or more in thickness (i.e., 1 mm thick film). All of the layers of the plenum when connected may have a total plenum thickness of about 4 mm or more, about 6 mm or more, about 8 mm or more, or about 10 mm or more. The plenum may have a total thickness of about 25 mm or les, about 20 mm or less, about 15 mm or less, or about 12 mm or less. The plenum may include a plurality of attachment holes for connecting the distribution system to the cushion. The plenum, layers of the plenum (cap and/or support layer) or a combination thereof, may have a generally uniform thickness. The plenum, layers of the plenum (cap and/or support layer) or a combination thereof, may have a generally non-uniform or varying thickness.

The plenum may include a plurality of attachment holes. The plurality of attachment holes may assist with connecting the plenum with the cushion, seat suspension, or both. The cushion, seat suspension, or both may be connected to the plenum via the attachment holes. The plurality of attachment holes may pierce through the top layer, support layer, connection, or a combination thereof. The air may enter the plenum through the support layer.

The support layer may function to allow air to enter into the plenum and to direct air towards exit locations. The support layer may be permeable. Preferably, the support layer may be impermeable, include an impermeable coating, or both. The support layer may be a porous material. The support layer may be a solid. The support layer may be made of a polymeric material. The support layer and the cap layer may be made of the same material. Preferably, the support layer and the cap layer are made of different materials. The support layer may be made of acrylonitrile butadiene styrene (ABS); an impact modified acrylonitrile-methyl acrylate copolymer amorphous polyethylene terephthalate (APET); clear cellulose acetate; color cellulose acetate; cellulose acetate butyrate; ethyl vinyl acetate (EVA); Pelathane; Polyethylene Terphthatate (PET); Polyethylene Terphthalate Glycol (PETG); Pliofilm (Rubber hydrochloride); Polyurethane; polyurethane foam; polyurethane-vinyl film; polyurethane estane film; polyvinyl acetate, polyvinyl chloride (clear PCV); polyvinyl chloride (color PVC); Polyvinyl chloride (opaque PVC); Polyvinyl chloride (Semi-rigid PVC); Polyvinyl chloride (rigid PVC); Polyvinyl chloride (flexible, glass-binded PVC); Polyvinyl chloride (coated cloth and paper PVC); Polyvinyl chloride (adhesive emulsions PVC); Polyvinylidene Chloride (Saran); or a combination thereof. The support layer and the cap layer may be formed separately and then connected together. The support layer may be one or more layers. Preferably, the support layer is a single layer. The support layer may include one or more recesses that are in communication with one or more blowers. The support layer may include one or more connection recesses that assist in connecting the blower to the plenum. The support layer may include an inlet. The inlet in the support layer may be an absence of material where air may move between the blower and the plenum. The inlet may be flush (e.g., entirely located within a plane of the support layer). The inlet may include a venturi or duct that may extend from the support layer. The blower may be connected to an inlet (e.g., when the conditioning system is used in push mode). The blower may be connected to an outlet (e.g., when the conditioning system is used in pull mode). Thus, if the conditioning system is changeable between a pull mode and a push mode the blower may be connected to both an inlet and an outlet. The inlet may be both part of the blower connection feature and part of the duct. The venturi or duct may create a connection with the inlet, outlet, or both of the blower. If the inlet is a duct or venturi then the shape and configuration may be any of the configurations discussed herein for the duct. The blower and plenum may form a connection without any intervening structures (e.g., gluing, heat staking). The blower may be attached to the one or more blower connection feature.

The blower connection feature may function to create an air seal between the blower and support layer. The blower connection feature may use rubber, plastic, fleece, foam, or a combination thereof to form an air seal with the blower. The blower connection feature may include a mating feature to the blower. The mating feature of the blower connection feature may be a twist and lock feature or a press and snap feature. The blower connection feature may have a cross-sectional shape of a cone, cylinder, funnel, square, rectangle, triangle, pyramid, or a combination thereof. The blower connection feature may function to direct air between the blower and the ventilation holes. The support layer may be separated from an cap layer by an open space.

The open space may function to create an open area between the cap layer and the support layer. The open space may prevent the support layer and the cap layer from being moved into contact. The open space may be free of additional material. The open space may resist compression by one or more connection layers extending therethrough. The open may be an absence of material that is located between the top layer and the support layer. The open space may allow fluid move to predetermined locations so that conditioning is provided to a predetermined region, an occupant, or both. The open space may include one or more features such as a baffle or a connection layer that extend therethrough.

The one or more baffles may function to distribute air within the open space, distribute air to the ventilation holes, provide uniform distribution of air, or a combination thereof. The one or more baffles may function to create or maintain an air gap. The one or more baffles may function to support a barrier layer, a cap layer, or both so that an air gap is maintained. The one or more baffles may create turbulence within the air gap. The one or more baffles may be connected to the barrier layer, the cap layer, or both. The one or more baffles may create a path between the one or more ventilation holes and the blower so that fluid passes through each of the ventilation holes and not only the holes closest to the blower. The one or more baffles may be a portion of the cap layer, the support layer, or both that extend into the open space to create a fluid barrier. The one or more baffles may be added into an open space between layers before the plenum is sealed. The one or more baffles may be curved, substantially straight, teardrop shaped, air plane wing shaped, crescent shaped, serpentine shaped, have a curved portion, have a straight portion, or a combination thereof. The baffles may be rounded on either end. The tear drop baffles have a body that decreases in width from one end to the other end. The baffles that are tear drop shaped may have sides that are substantially straight, concave, convex, curved, or any combination thereof. For example, the teardrop shaped baffle may have substantially straight sides with rounded ends. For example, the teardrop shaped baffle may have a middle body that is less in diameter than either end of the baffle. The baffles may have a leading and (an end that air contacts first) and a trailing end (an end the air contacts last as the air moves). The leading end may be a larger end of a baffle. The leading end may have a cross-sectional length that is about 1.2 times or more, about 1.5 times or more, about 2 times or more, about 3 times or more, about 4 times or more larger than the trailing end. The leading end may have a cross-sectional length that is about 10 times or less or about 5 times or less larger than the trailing end. A tear drop shaped baffle may have an end that comes to a point and an end that is rounded and larger in size than the end that comes to the point. The end that comes to the point may be the first end that fluid contacts as fluid is moved through the distribution system. For example, if the air mover is in push mode air may leave the blower, contact the point, move to a hole, and exit the plenum through the hole. Preferably, the end with the point (e.g., trailing end) may be a side that is contacted last. The air may travel around a rounded larger side (e.g., leading end) and then to the point (e.g., trailing end). Depending on whether the plenum is used in a push system or a pull system will determine the direction that the baffles face. For example, in push mode the leading end will face the blower and in pull mode the leading end will face the ventilation holes. The one or more baffles may radiate outwards away from the blower attachment feature. The baffles may be located in straight lines that extend from a center point. The center point may be a rotational axis of a blower.

The one or more baffles may have a height measured from the support layer to a top surface of the baffles that is generally the same amongst all baffles. The one or more baffles may have a height measured from the support layer to a top surface of the baffles that is different amongst the baffles. For example, some baffles may be taller or shorter than other baffles. For example, one or more baffles farthest from the blower connection feature may be taller than one or more baffles located closer to the blower connection feature, or vice versa. A top surface of the one or more baffles may be generally planar or parallel to the support layer. A top surface of the one or more baffles may be sloped or angled relative to the support layer. A top surface of the one or more baffles may be concave or convex or scalloped shaped. A top surface of the one or more baffles is the surface of the baffle spaced furthest apart from the support layer. The side surfaces of the one or more baffles (i.e., surfaces generally perpendicular to the top surface of the baffle) may be generally planar or may be cured, scalloped, concave, convex.

The one or more baffles may be located proximate to the blower attachment feature and assist in facilitating air between the blower and the one or more ventilation holes. For example, the baffles may assist the blower in moving equal amounts of air through a ventilation hole that is located within 10 cm of the blower as the blower moves through a ventilation hole that is between 25 cm and 40 cm away. The one or more baffles may assist in directing air from a blower that is not centrally located to ventilation holes that are distal from the blower. For example, a blower may be located in a top quarter of a plenum and the baffles may assist ventilation holes in a bottom quarter to distribute substantially a same volume of air as ventilation holes in the other three quarters of the plenum. For example, if the ventilation holes are not symmetrically spaced apart then the baffles will assist in distributing the air to more equally distribute the air to each ventilation hole (e.g., the volume distribution from ventilation hole to ventilation hole may have a difference of about 50 percent or less, about 40 percent or less, preferably about 30 percent or less, more preferably about 20 percent or less, and most preferably about 10 percent or less). The symmetry of the plenum, location of the ventilation holes, location of the blower, or a combination thereof may be directly proportional to the number of baffles present in the plenum. For example, if a blower is centrally located and the ventilation holes are symmetrically located along the plenum then two or more baffles may be needed. If the blower is not centrally located and the ventilations holes are asymmetrically located (relative to a 4-quadrant grid with a center being in a center of the plenum) then 4 or 5 or more baffles may be needed. The open space may include 20 or more baffles, 30 or more baffles, 40 or more baffles, 50 or more baffles, 60 or more baffles, or even 70 or more baffles. The open space may include 150 or less baffles, 120 or less baffles, 100 or less baffles or about 80 or less baffles. Some or all of the baffles may be smaller than the ventilation holes. The baffles my be located within concentric circles. The baffles may all be radially aligned. Some of the baffles may be radially aligned and some of the baffles may be located between the radial alignment. The one or more baffles may be shaped in a way to assist the flow of air from the blower to the one or more ventilation holes in an even fluid speed.

The one or more baffles may have a shape to promote laminar flow. For example, the baffles may be generally straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. The one or more baffles may be configured to prevent turbulent flow, preventing the open space from dosing, or both. For example, the baffles may be straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. For example, the baffles may increase in cross-sectional width as air moves away from the blower connection feature. For example, the baffles may increase in cross-sectional width as air moves towards to the blower connection feature. The baffles may promote turbulence in predetermined regions or locations. Preferably, the baffles promote laminar flow throughout the open space and particularly in regions around inlets, outlets, or both. The baffles may have a height that is substantially the same height as a distance between a top layer and a support layer of the plenum. The baffles may have a height that is less than a distance between the top layer and the support layer of the plenum. The baffles may divide the plenum so that more than one blower may be used. The baffles may divide a plenum so that one region may be a push region and one region may be a pull region. The one or more baffles may be a connection layer or may be in addition to a connection layer.

The one or more connection layers may function to connect the cap layer, the support layer, or both together. The one or more connection layers may connect an cap layer to a baffle. The one or more connection layers may be adhesive that connects two layers together. The one or more connection layers may be formed by a portion of two different layers melting, adhering, liquifying, softening, attaching, or a combination thereof so that a layer that is a mixture of two different layers or portions is formed to hold the two layers together. The connection layers may have two faces. The connection layers may be a peel and stick material. The connection layers may connect the plenum to a cushion. The connection layer may be the only connection between a plenum and a cushion. The one or more connection layers may be a dry adhesive, a pressure sensitive adhesive, heat staking, melting, a hot glue, a moisture cure adhesive, thermal cure adhesive, or a combination thereof.

The cap layer may function to distribute air flow to predetermined locations. The cap layer may include one or more ventilation holes. The one or more ventilation holes may be a porous region, fluid permeable regions, through hole, absence of material, or a combination thereof. The cap layer may include a plurality of ventilation holes, outlets, inlets, or a combination thereof. The one or more ventilation holes may be aligned with cushion holes in a cushion. The one or more ventilation holes may distribute air from the plenum to locations that correspond with regions of an occupant (e.g., lower back or legs). The one or more ventilation holes may be an absence of material. The one or more ventilation holes may be formed by removing material. The one or more ventilation holes may be formed by cutting or removing a portion of the cap layer. The cap layer and the support layer may be connected together around edges to form a seam or connection. The cap layer may be a flexible material. The cap layer may be made of a fleece or fabric. The cap layer may be made of polyester or polyethylene terephthalate. The cap layer, barrier layer, support layer, or a combination thereof may be ultrasonically bonded together, melted together, glued together, heat staked, friction welded, RF welded, or a combination thereof. The cap layer may extend beyond the support layer. The cap layer may be fluid permeable. For example, air may flow through the cap layer. The cap layer may be fluid impermeable. The cap layer may include a barrier that prevents fluid from passing through the cap layer. The cap layer may be connected to a barrier layer.

The barrier layer functions to prevent fluid from passing through the cap layer or in a pre-determined direction. The barrier layer may be or include a polymer, plastic, sheet, film, a polyurethane, Mylar, polyester, or a combination thereof. The barrier layer may be a material that when connected to the cap layer fills the voids in the cap layer and prevents fluid from passing through the cap layer. The barrier layer may mirror the shape of the cap layer. The barrier layer and the cap layer may be connected together along an entire area to form a new single layer. The barrier layer and the cap layer may only be connected along edges or a periphery. The cap layer, support layer, barrier layer, or a combination thereof may include one or more contours, be a mirror shape, or both.

The one or more contours may function to shape the plenum to a cushion. The one or more contours may function to shape the plenum so that a rear side of the cushion and the plenum have a mirror shape. The one or more contours may be a bend, an arc, or both. The one or more contours may be located in the top layer and the support layer. The one or more contours may be located proximate to or perpendicular to one or more connections (e.g., seals).

The one or more connection walls may form connections that may function to create sealed edges so that air can only leave the plenum through predetermined locations. The one or more connection walls may extend along each edge of the plenum so that a completely sealed plenum is formed. The one or more connection walls may extend along only longitudinal edges or lateral edges. Preferably, the one or more connection walls may extend around a periphery of the plenum so that all edges of the plenum substantially prevent air leakage. The one or more connection walls may be located in a primary plane of the barrier layer, support layer, the cap layer, or a combination thereof. For example, baffles, ventilation holes, or both may extend outward from the primary plane. The connection walls may be a peripheral lip and the cap layer, the barrier layer, or both may extend around a portion of the support layer and into contact with the connection wall to form a connection. The connection walls may be connected together mechanically, chemically, or both. Preferably, the connection walls may be heated and bonded together. The connection walls may be connected together via welding (e.g., friction welding, RF welding, heat staking, ultrasonic welding, or a combination thereof). The connection walls may be all substantially a same size so that they overlap each other and then can be connected together. The one or more connection walls may form a periphery around an open space, ventilation holes, or both.

The one or more ventilation holes may function to align a plenum with a cushion, to connect a plenum to a cushion, or both. The one or more ventilation holes may extend through any portion of the plenum. The one or more ventilation holes may extend through a seam, extra material, an ear along one or more edges of the plenum, or a combination thereof preferably, the one or more ventilation holes extend through the cap layer of the plenum. More preferably, the one or more ventilation holes are located in the cap layer proximate to or above an open space. The one or more ventilation holes may only be used to align the plenum with the cushion, holes in the cushion, or both. The one or more ventilation holes may be an inlet, an outlet, or both. The one or more ventilation holes may be free of a connection and may be used for alignment by temporarily being contacted during attachment. Preferably, the one or more ventilation holes assist in connecting the plenum to the cushion. The plenum may be adhesively connected to the cushion. A connection, a seam, or both of a plenum may be adhesively connected to a rear surface of a cushion so that the plenum and the cushion are connected together at locations around the ventilation holes. Preferably, the plenum is free of an adhesive connection to the cushion and preferably are free of adhesive at the ventilation holes. The ventilation holes may extend axially outward from the top layer of the plenum. The one or more ventilation holes may be different diameters relative to another ventilation hole to assist with optimal air flow between the blower and the seat cushion. The one or more ventilation holes may be a plurality of ventilation holes and each of the ventilation holes includes a cross-sectional length and the cross-sectional length of each of the ventilation holes further from the blower have a greater cross-sectional length than the ventilation holes closer to the blower. Preferably, the ventilation hole is an absence of material of a layer of the plenum and the ventilation hole is located in the plane of the layer of the plenum. The ventilation holes may be a region that is fluid permeable. The ventilation holes may allow fluid to pass through an cap layer. The ventilation holes may include one or more ducts. Preferably, the ventilation holes are free of ducts. The ventilation holes may be fluidly connected to one or more blowers.

The blower functions to push air, pull air, or both. The blower may be movable with the cushion, the plenum, or both as an occupant sits on the cushion or leaves the cushion. The blower may include an opposite mating feature to the blower connection feature. The blower may be connected to the seat suspension. The blower may be an axial fan. Preferably, the blower may be a radial fan. The blower may include one or more impellers that move air through the blower, the blower housing, the plenum, or a combination thereof. The blower includes an inlet and an outlet. The inlet may be on the bottom side or the top side. Preferably, the inlet is in the bottom side of the blower. The inlet or the outlet is connected to the plenum via the attachment ring, a clip, a blower attachment mechanism, or a combination thereof. The dips of the blower (e.g., blower clips) may connect the blower to a seat suspension and the blower may be connected to the plenum or free of direct connection with the blower. The inlet and outlet may allow air to move into and out of the housing of the blower.

The one or more cushions may function to support an occupant, a conditioning system, or both. The one or more cushions may extend over a bottom or a back of a frame to form a portion of a vehicle seat. The one or more cushions may be made of an open cell foam, a closed cell foam, or both. The one or more cushions may be located between a trim layer and a frame. The one or more cushions may be located between an occupant and a conditioning system, a plenum, a blower, or a combination thereof. The cushion may include one or more supports, one or more seat suspensions, or both that assist in connecting a plenum, a blower, or both to the cushion.

The one or more seat suspensions may be installed before a cushion. The seat suspension may include a wire frame, a plate frame, or both. The seat suspension may support the plenum. The plenum may be located between the seat suspension and the cushion. The blower may be located between the seat suspension and the plenum. The blower may be located on a rear surface of a seat suspension and a portion of the blower, the plenum, or both may extend through the seat suspension to create a connection. The seat suspension may be located between the blower and the plenum. The seat suspension may be located on a rear side of a cushion.

The process may include one or more of the following steps. The plenum may be attached to the cushion. The blower may be connected to the plenum. The plenum, the blower, or both may be connected to the seat suspension. The cushion may be applied over the plenum after the plenum is connected to the blower, the seat suspension, or both.

Figure 1:
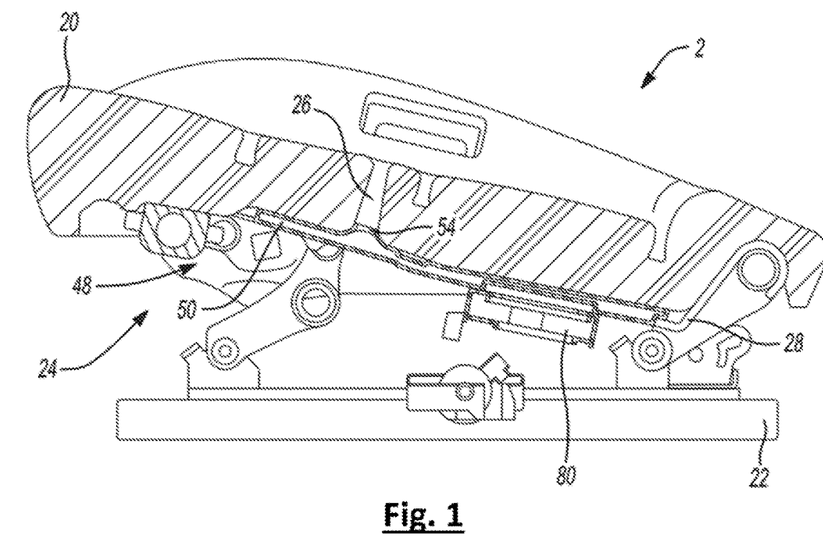
FIG. 1 is a side view of a distribution system connected to a rear side (B-side) of a cushion and supported by the seat suspension.

FIG. 1 illustrates a side view of a conditioning system 2 including a distribution system 48 connected to a cushion 20 of a vehicle seat. The cushion 20 includes a rear or bottom side 24 with one or more cushion holes 26 that extend all of the way through the cushion 20. The cushion 20 rests upon a plenum 50 that is attached to a seat suspension 28 of a support 22. The cushion hole 26 and the ventilation hole 54 of the plenum 50 are aligned so that a fluid can be moved by the blower 80 between an occupant (not shown) and the blower 80 via the cushion 20 and the plenum 50.

Figure 2:
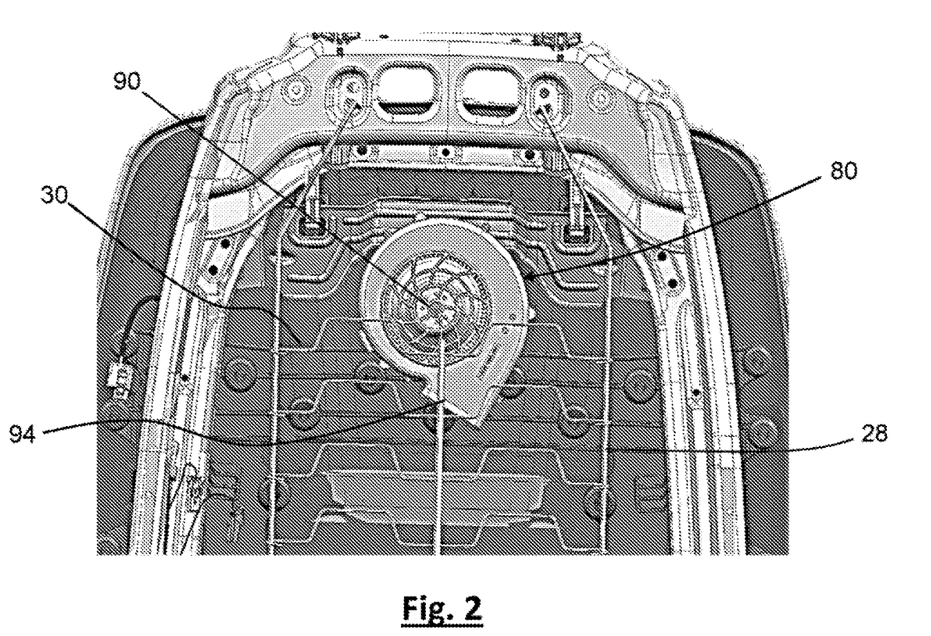
FIG. 2 is a plan view of a rear of a vehicle seat including the distribution system.

FIG. 2 illustrates a blower 80 connected to the seat suspension 28. The blower 80 includes an inlet 90 and an outlet 94. The blower 80 is partially located behind the wire frames 30.

Figure 3:
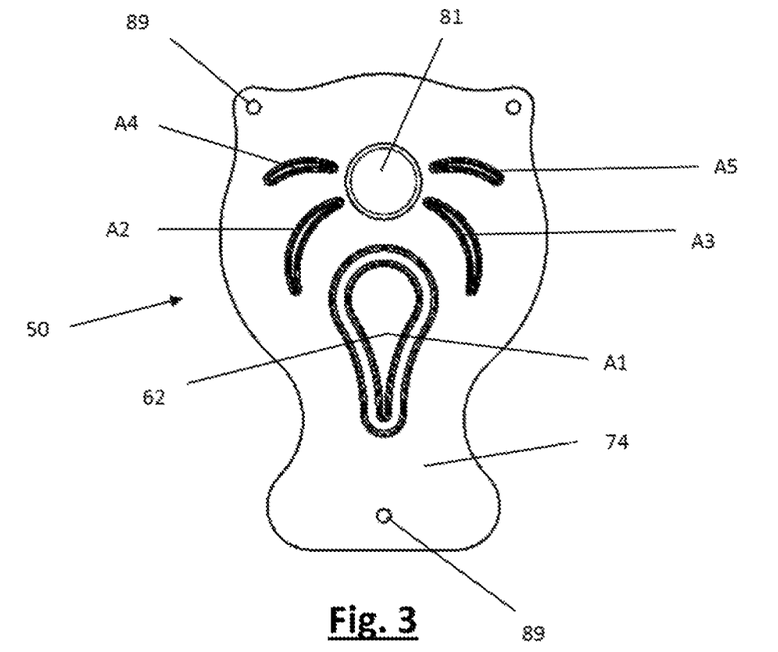
FIG. 3 is a top view of a support layer.

FIG. 3 is atop view of the support layer 74 of a plenum 50. The support layer 74 includes a plurality of attachment holes 89. The support layer 74 includes a blower connection feature 81. The support layer 74 includes a plurality of baffles 62, and A1, A2, A3, A4, and A5 are baffles 62. The plurality of baffles 62 are positioned around blower connection feature 81. The plurality of baffles 62 are such that all of the baffles 62 are rounded at any edge. Baffle A1 is substantially in the center of the support layer 74. Baffle A1 is teardrop shaped such that baffle A1 is narrow closest to the blower connection feature 81; increases to its largest width; and then decreases in width in a concave fashion to a rounded edge at the farthest point from the blower connection feature 81. Baffles A2 and A3 are located between baffle A1 and baffles A4 and A5. Baffles A2 and A3 are crescent shaped. Baffles A2 and A3 curve downward from the blower connection feature 81 toward baffle A1. Baffles A4 and A5 are proximate to the blower connection feature 81 and baffles A2 and A3. Baffles A4 and A5 are substantially perpendicular to baffle A1. Baffles A4 and A5 are crescent shaped and curve slightly toward baffles A1, A2, and A3.

Figure 4:
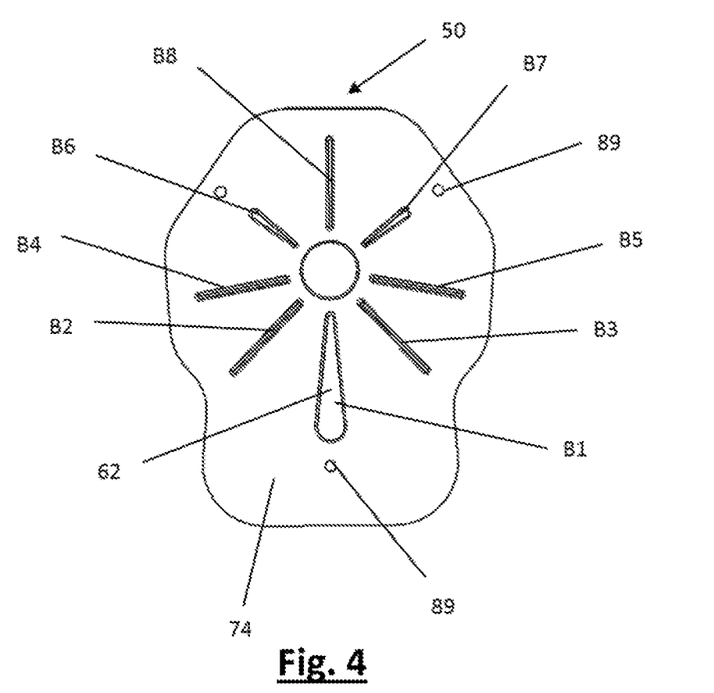
FIG. 4 is a top view of a support layer.

FIG. 4 is a top view of a support layer 74 of a plenum 50. The support layer 74 includes a plurality of attachment holes 89 that pierce through the support layer 74. The support layer 74 includes a plurality of baffles 62 where B1, B2, B3, B4, B5, B6, B7, and B8 are baffles 62 that radiate around the blower connection feature 81. Baffles B1, B6, and B7 are tear drop shaped such that the narrowest diameter of the baffle 62 is nearest to the blower connection feature 81. Baffles B1, B6, and B7 increase in diameter with a substantially straight periphery as B1, B6, and B7 radiate away from the blower connection feature 81 until each tapers off to a rounded edge that is closest to the attachment holes 89. Baffles B2, B3, B4, B5, and B8 are rounded on both ends. Baffles B2, B3, B4, B5, and B8 radiate away from the blower connection feature 81 in a substantially straight direction and even diameter.

Figure 5:
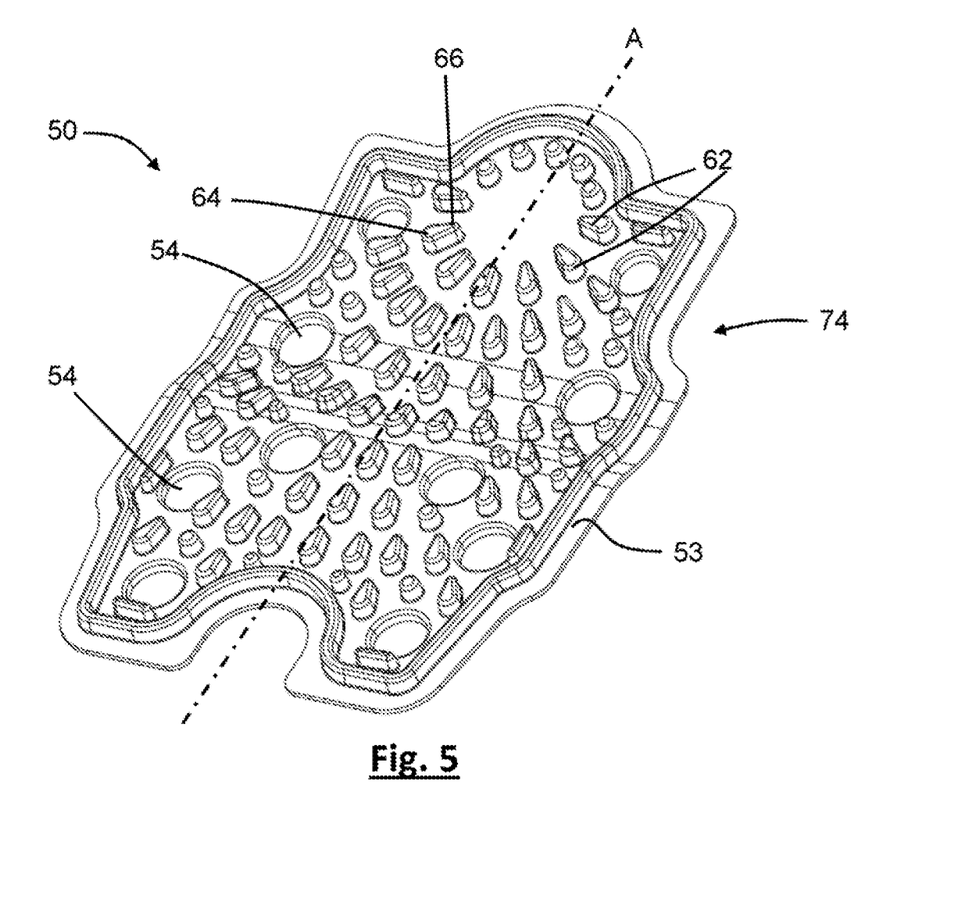
FIG. 5 is a perspective view of a support layer.

FIG. 5 is atop perspective view of a support layer 74 of a plenum 50. The support layer 74 includes a plurality of vent holes 54 a plurality of baffles 62 and a connection wall 53 that extends around a periphery of the support layer 74. Some of the baffles 62 are tear drop shaped with a leading end 64 and a trailing end 66. The leading end 64 is larger than the trailing end 66 and air contacts the leading end 64 first as air is moved towards an air mover. As shown the baffles 62 are configured for a pull mode if the baffles were configured for push mode the leading end 64 and the trailing end 66 would be switched.

Figure 6A:
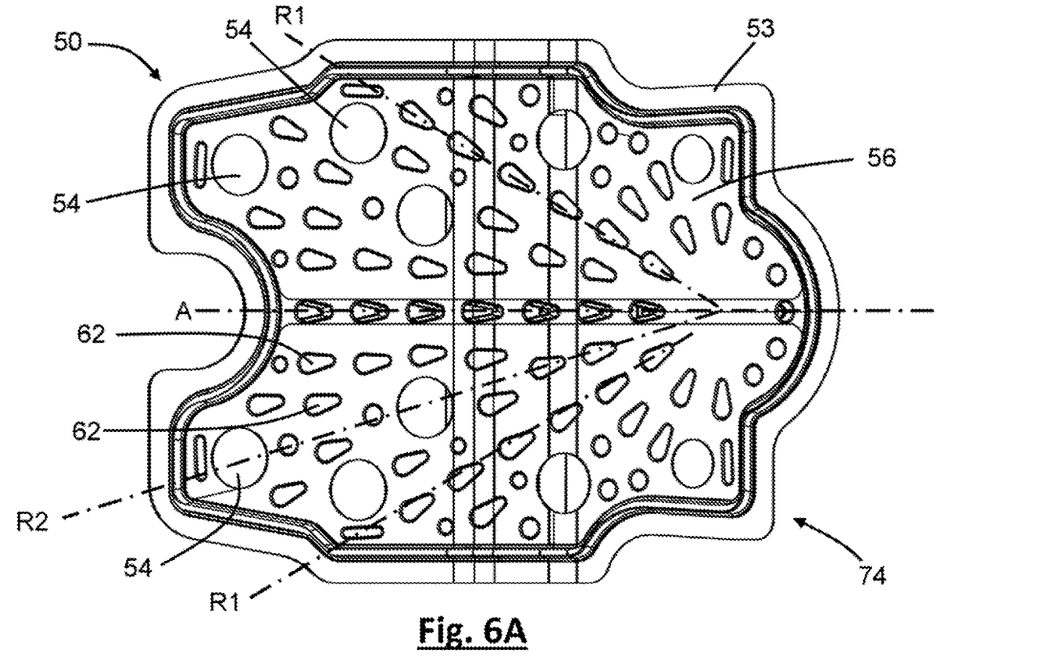
FIG. 6A is a top view of the plenum.

FIG. 6A illustrates a plenum 50 having a support layer 74 that is covered by a cap layer 56. The support layer 74 and the cap layer 56 are connected at the connection wall 53. The cap layer 56 is supported above the support layer 74 by the baffles 62 so that an air gap is formed. Vent holes 54 extend through the support layer 74 to provide fluid to a cushion (now shown) and then an occupant (not shown). The support layer 74 extends along an axis A. The support layer 74 and/or the features thereof (ventilation holes 54, baffles 62, etc.) may be generally symmetrical about the axis A.

Figure 6B:
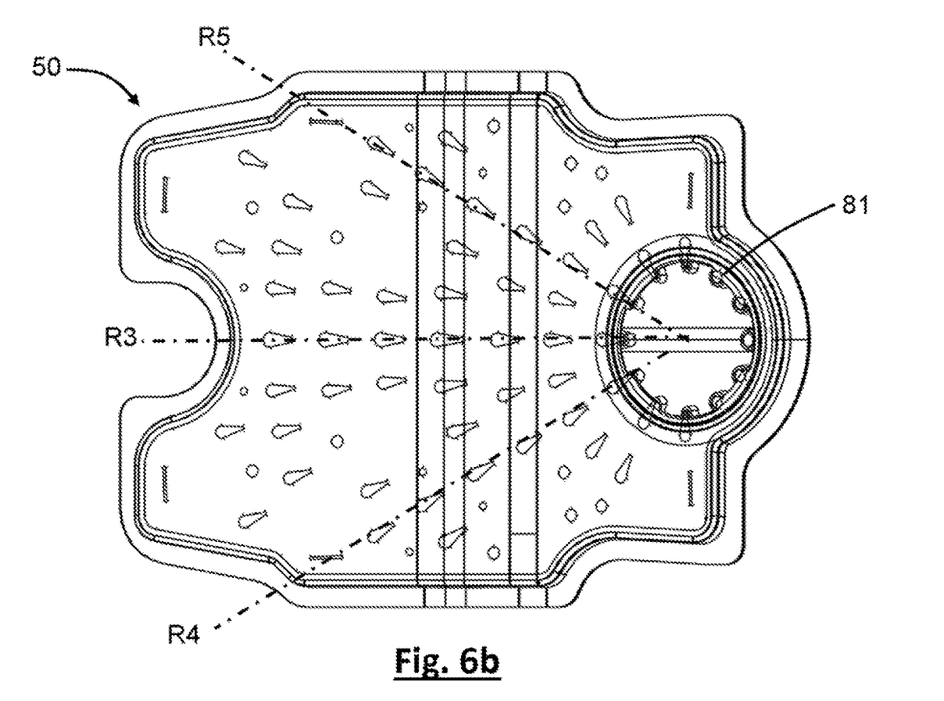
FIG. 6B is a bottom view of the plenum.

FIG. 6B illustrates a rear surface of a plenum 50. The rear surface includes a blower connection feature 81 so that a blower (now shown) can connect to the plenum 50.

Referring to both FIGS. 6A and 6B, some of the plurality of baffles 62 may be arranged along axis or generally linear rows R1, R2, R3, R4, R5 that extend from the blower connection feature 81 or a region of the blower connection feature. Some of the rows may be free of intersecting any ventilation holes 54. Some of the rows like R2 in FIG. 6A may include one or more ventilation holes 54 arranged along the R2 or intersect the row R2 or a row or axis R2 may pass through a ventilation hole 54.

Figure 6C:
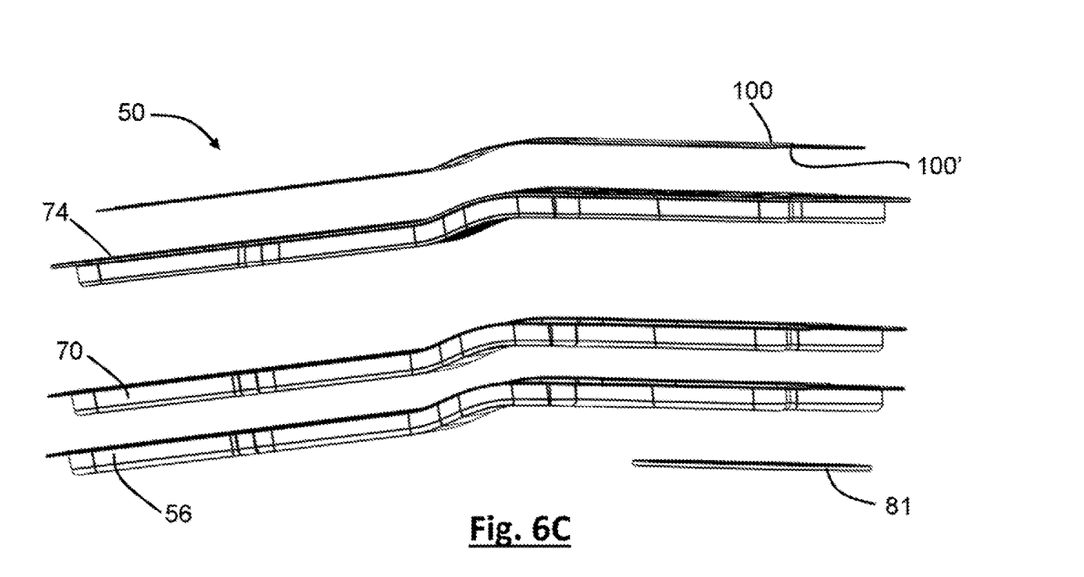
FIG. 6C is an exploded view of the plenum.

FIG. 6C is an exploded view of the plenum 50. The plenum 50 includes a connection layer 100 that connects the plenum 50 to a cushion (not shown) and a second connection layer 100' that connects the connection layer 100 to the plenum 50 (the connection layer may be a two-faced adhesive layer). The plenum 50 includes a support layer 74 connected to a barrier layer 70 and a cap layer 56. A blower connection feature 81 assists in connecting a blower (not shown) to the plenum 50.

Figure 7:
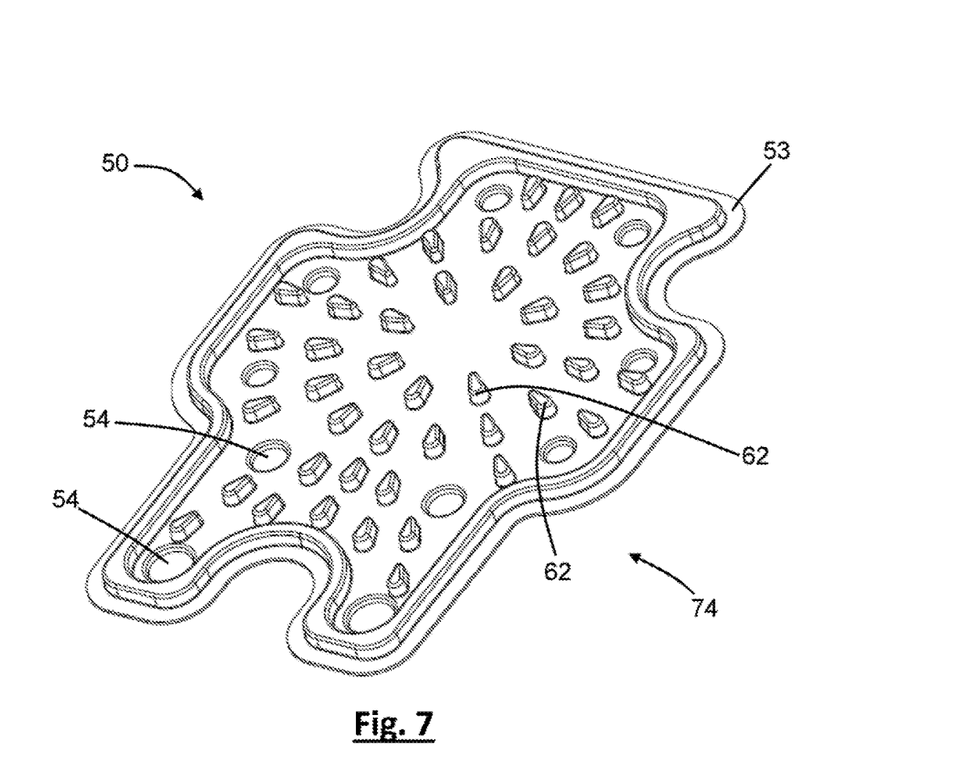
FIG. 7 is a perspective view of a support layer.

FIG. 7 is a perspective view of a support layer 74 of a plenum 50. The support layer 74 includes a plurality of ventilation holes 54, baffles 62, and has a connection wall 53 forming a periphery around the support layer 74. The ventilation holes 54 may be arranged along a periphery of the support layer 74. A central portion of the support layer 74 (i.e., a region off set from the periphery may be free of any ventilation holes 54.

Figure 8A:
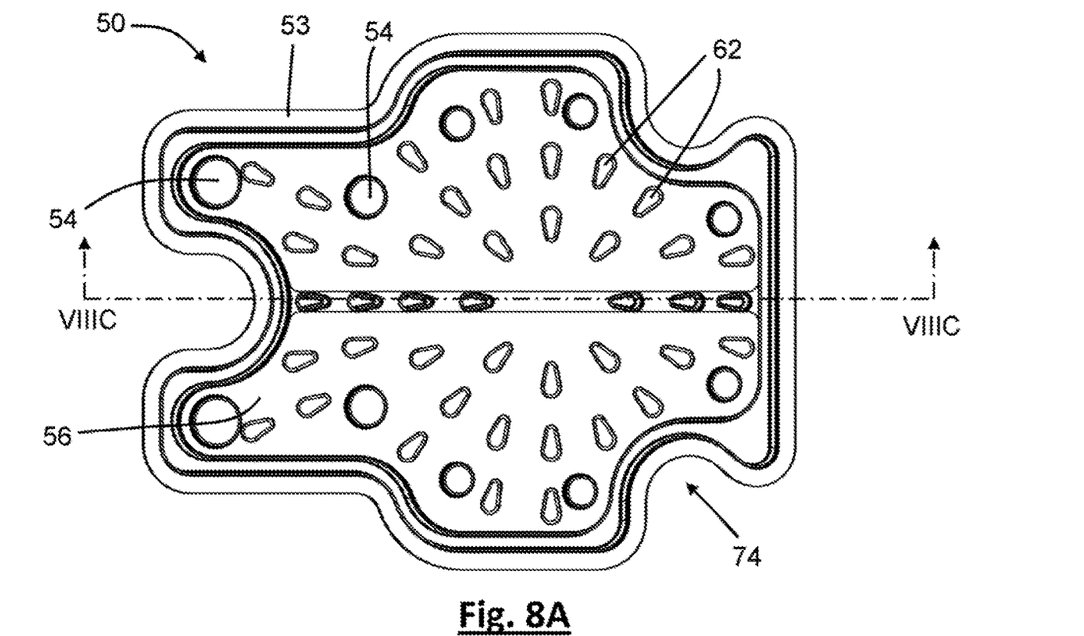
FIG. 8A is a top view of the plenum.

FIG. 8A illustrates a top view of the plenum 50. The plenum 50 includes a support layer 74 with a cap layer 56 extending thereover. The cap layer 65 and the support layer 74 are connected at the connection wall 53. The support layer 74 includes a plurality of baffles 62 that support the cap layer 65 above the support layer 74 so that an open space is created for air to move between a blower (not shown) and the ventilation holes 54.

Figure 8B:
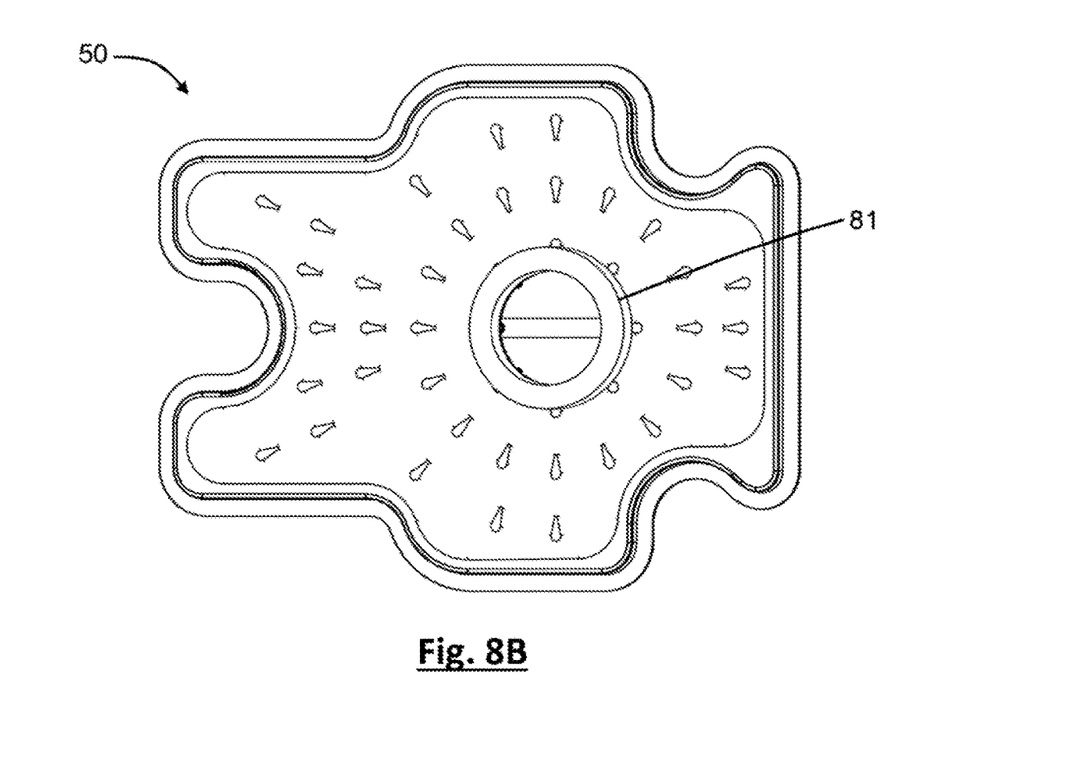
FIG. 8B is a bottom view of the plenum.

FIG. 8B illustrates a rear of a plenum 50 having a blower connection feature 81.

Figure 8C:
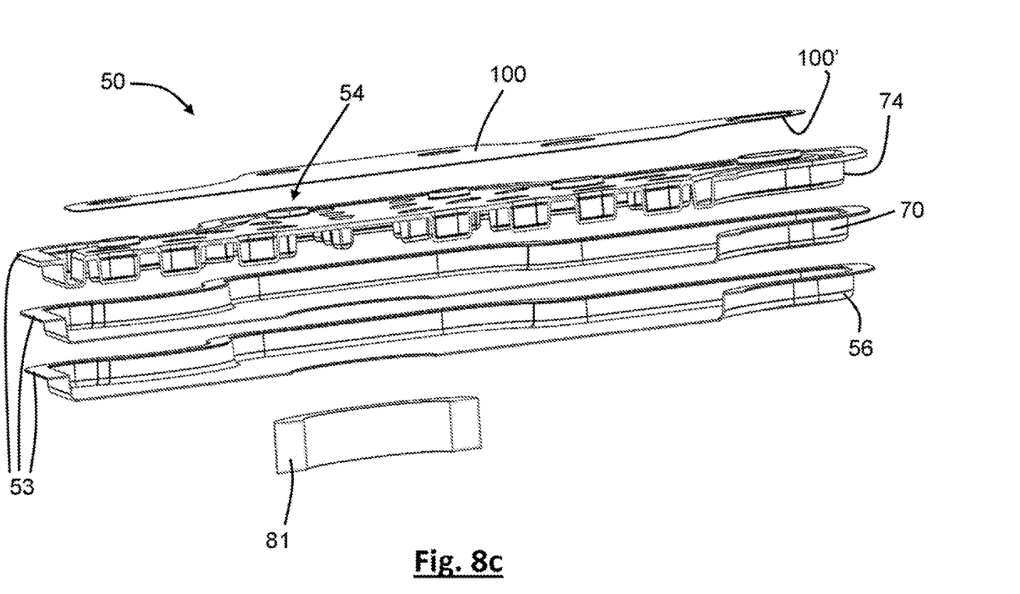
FIG. 8C is a cross-sectional view of the plenum of FIG. 8A along lines VIIIC-VIIIC.

FIG. 8C is an exploded cross-sectional view of FIG. 8A along lines VIIIC-VIIIC. The plenum 50 includes a connection layer 100 and a second connection layer 100' that connect a support layer 74 to a cushion (not shown). The support layer 74 is covered on a second side by a barrier layer 70 and a cap layer 56. Each of the support layer 74, barrier layer 70, and the cap laver 56 include a connection wall 53 that are connected together so that the barrier layer 70 and the cap layer 56 are maintained in a taught position over the support layer 74. The plenum 50 includes a blower connection feature 81 to connect a blower (not shown) to the plenum 50.

Any numerical values recited herein include all values from the lower value to the cap value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A distribution system comprising:
    a plenum configured to connect a blower to a cushion of a vehicle seat, the plenum including: a cap layer, a support layer, and an open space formed between the cap layer and the support layer; the support layer is a generally rigid material and includes one or more ventilation holes and a blower connection feature for connecting the blower to the plenum, the cap layer is a generally flexible material that is connected to the support layer, the cap layer extends around a portion of the support layer,
    wherein the open space includes one or more baffles that assist in directing fluid between the blower and the one or more ventilation holes.

2. The distribution system of claim 1, wherein the one or more of baffles are arranged radially around the blower connection feature.

3. The distribution system of claim 1, wherein the one or more baffles comprise a plurality of baffles that are generally aligned in one or more generally linear rows that radially extend from the blower connection feature.

4. The distribution system of claim 3, wherein the one or more ventilation holes are arranged along the one or more generally linear rows.

5. The distribution system of claim 3, wherein the one or more generally linear rows are free of any ventilation holes.

6. The distribution system of claim 1, wherein the one or more baffles comprise a plurality of baffles, and some of the plurality of baffles are circular shaped and are disposed amongst one or more tear drop shaped baffles.

7. The distribution system of claim 1, wherein the one or more baffles comprise a plurality of baffles and some or all of the plurality of baffles have a size that is smaller than a size of the one or more ventilation holes.

8. The distribution system of claim 1, wherein the support layer comprises a plurality of ventilation holes, the plurality of ventilation holes are disposed generally symmetrically on the support layer about a center axis of the support layer and/or the plurality of ventilation holes are arranged along a periphery of the support layer.

9. The distribution system of claim 1, wherein the one or more baffles comprise a plurality of baffles and some of the plurality of baffles are two or more concentric circles.

10. The distribution system of claim 1, wherein the cap layer is a fleece or fabric material, or the cap layer is made of polyester or polyethylene terephthalate.

11. The distribution system of claim 1, wherein the cap layer is connected to the support layer by welding, adhesive, ultrasonic welding, RF welding, or a combination thereof.

12. A vehicle seat comprising the distribution system according to claim 1.

13. The distribution system according to claim 1, wherein the cap layer has a connection wall and the support layer has a connection wall, and the connection wall of the cap layer is adjacent to or in contact with the connection wall of the support layer, wherein the connection wall of the cap layer is lip that extends away from a side wall of the cap layer.

14. The distribution system according to claim 13, wherein the connection wall of the support layer is lip that extends away from a side wall of the cap layer.

15. The distribution system according to claim 14, wherein the connection wall of the cap layer extends around a periphery of the cap layer and/or the connection wall of the support layer extends around a periphery of the support layer.

16. The distribution system according to claim 1, wherein the plenum comprises a barrier layer between the support layer and the cap layer, the cap layer extends around a portion of the barrier layer.

17. The distribution system according to claim 16, wherein the barrier layer has a connection wall, the cap layer has a connection wall, and the support layer has a connection wall, and the connection wall of the cap layer is in contact with the connection wall of the barrier layer.

18. The distribution system according to claim 17, wherein the connection wall of the barrier layer is in contact with the connection wall of the support layer.

19. The distribution system according to claim 17, wherein the connection wall of the barrier layer is lip that extends away from a side wall of the barrier layer and/or the connection wall of the cap layer is lip that extends away from a side wall of the cap layer and/or the connection wall of the support layer is lip that extends away from a side wall of the cap layer.

20. The distribution system according to claim 19, wherein the connection wall of the barrier layer extends around a periphery of the barrier layer and/or the connection wall of the cap layer extends around a periphery of the cap layer and/or the connection wall of the support layer extends around a periphery of the support layer.

* * * * *